Patented Oct. 14, 1947

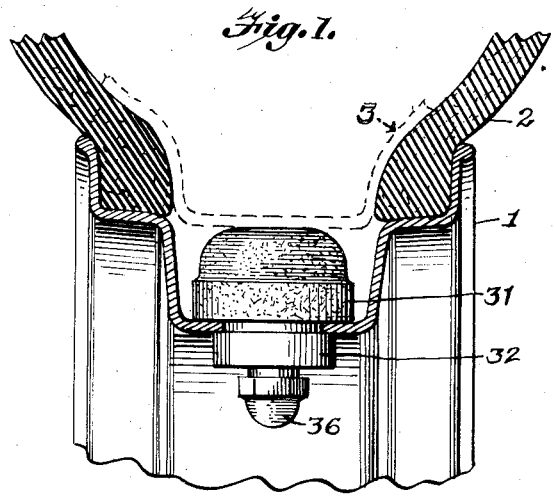
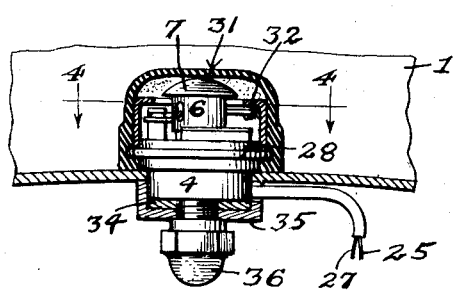
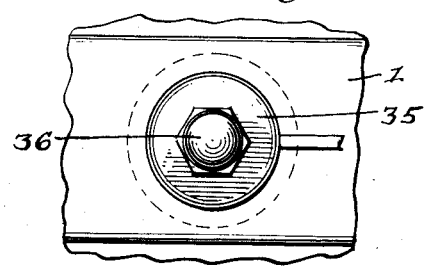
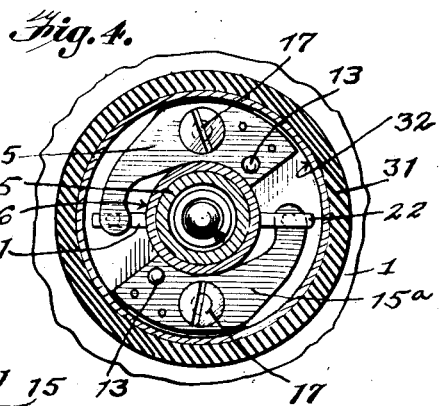
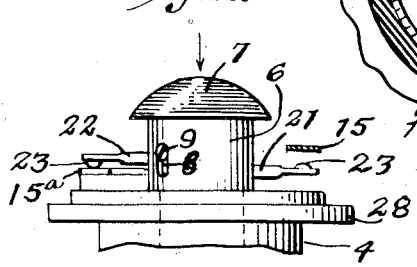
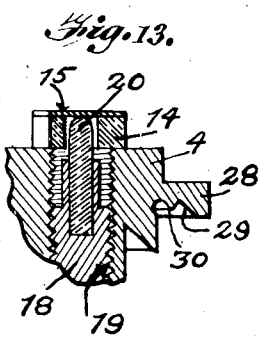

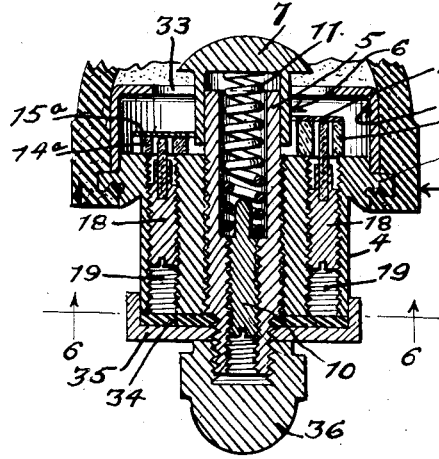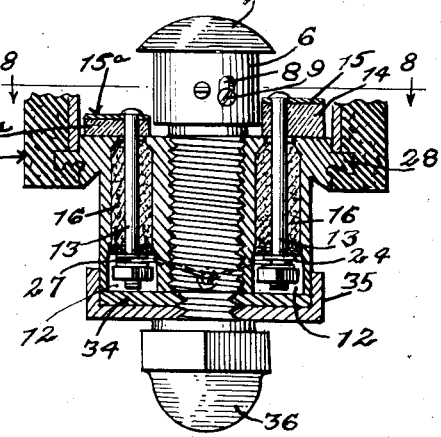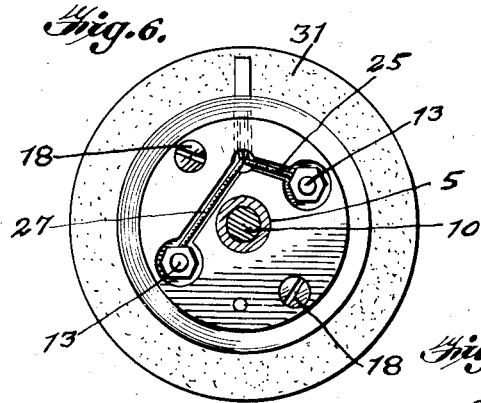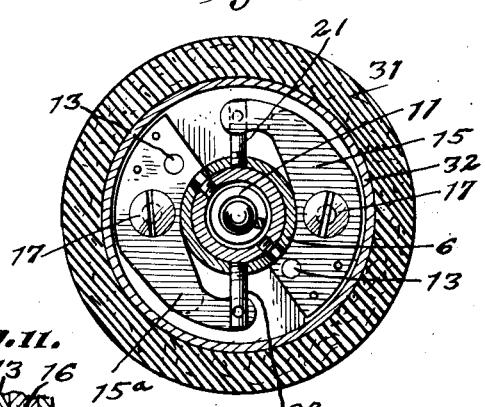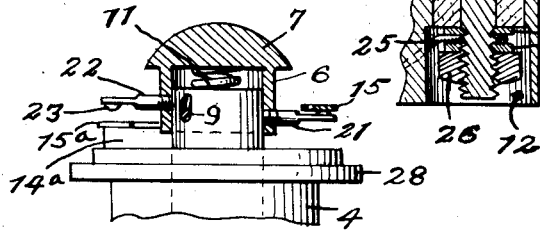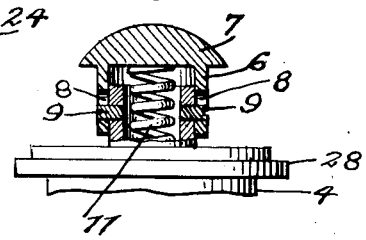
INVENTOR,
EDWARD C. JONES.

2,429,024

UNITED STATES PATENT OFFICE 2,429,024

TIRE PRESSURE INDICATOR

Edward C. Jones, San Antonio, Tex., assignor to Institute of Industrial Research, San Antonio, Tex.

Application July 16, 1945, Serial No. 605,329

9 Claims. (Cl. 200—58)

This invention relates to a tire pressure indicator.

An object of the invention is the construction of a novel and efficient device applied to the rim of the wheel of a motor vehicle, airplane, or the like, for indicating the pressure at all times within the pneumatic tire of said wheel.

Another object of the invention relates to a novel device that is attached to, or on or through the rim of a wheel and in contact with the inner tube of a pneumatic tire, the device being capable of indicating when the pressure in the tire is normal or satisfactory, or when the pressure is unsatisfactory or at a danger point.

A further object of the invention is the construction of a novel and efficient device wherein means is provided for a very accurate adjustment of the inner tube contact-head, as well as the contact springs in relation to the fingers of the circuits of the red and green light indicators.

A still further object of the invention is the improvement of the construction of indicators disclosed in my Patents Nos. 2,249,426, issued July 15, 1941, and 2,257,961, issued October 7, 1941.

With the foregoing and other objects in view, the invention comprises certain novel constructions, combinations, and arrangements of parts as will be hereinafter fully described, illustrated in the accompanying drawings, and more particularly pointed out in the appended claims.

In the drawings:

Figure 1 is a transverse fragmentary view of a rim and shoe or tire of a wheel, showing in elevation my novel device applied to the rim.

Figure 2 is a longitudinal vertical sectional view of a rim, showing partly in elevation and partly in section, the device, while Figure 3 is a bottom plan view of the same.

Figure 4 is an enlarged horizontal sectional view taken on line 4—4, Figure 2, and looking in the direction of the arrows.

Figure 5 is an enlarged, vertical, sectional view of the device, while

Figure 6 is a sectional view taken on line 6—6, Figure 5, and looking in the direction of the arrows.

Figure 7 is a fragmentary, vertical sectional view, showing particularly the terminal bolts of the device.

Figure 8 is a horizontal sectional view taken on line 8—8, Figure 7, and looking in the direction of the arrows.

Figure 9 is an enlarged fragmentary view, partly in elevation, and partly in vertical section, while Figure 10 is a similar view taken at a different vertical angle.

Figure 11 is an enlarged fragmentary vertical sectional view of the device.

Figure 12 is an enlarged fragmentary elevated view of the device.

Figure 13 is an enlarged fragmentary view of the device.

Referring to the drawings, in which I have shown the preferred embodiment of my invention, 1 designates the rim of a wheel, 2 is the shoe or tire, and 3 is the inner tube.

The improved and novel device comprises a housing or casing 4, which is provided with an externally and internally threaded primary spring-holding sleeve 5. This sleeve 5 is in the center of the casing, and projects at its upper end beyond the top of the casing, on which projecting end is slidably mounted sleeve 6; sleeve 6 is provided with a head 7. The sleeve 6 is provided with two elongated apertures 8 (Fig. 10) into which project screws 9; screws 9 are threaded at their inner ends into sleeve 5. By this construction the sleeve 6 is held in an assembled position upon sleeve 5.

In sleeve 5 is primary screw 10 which has at its upper end an extension projecting into the lower part of coil spring 11 (Fig. 5); the upper end of coil spring 11 bears against the inner face of head 7. By adjusting vertically screw 10, the tension of spring 11 can be governed to a nicety.

The housing or casing 4 is provided with two primary pockets 12. Terminal bolts 13 are partly in pockets 12. The upper end of the right hand bolt (Fig. 7) extends through fiber base 14 and angular contact spring 15. The left hand bolt extends through a fiber base 14a and through angular contact spring 15a. In the primary pockets 12 are suitable insulating means 16 which insulate the bolts 13 from the casing 4. Each angular contact spring is securely fastened by screw 17 to the fiber base so that these springs are insulated from the casing 4. The outer portion of each contact spring is left free, whereby vertical adjustment of this end may be obtained. The adjustment of the outer end of each angular spring is obtained through the medium of a screw 18, this auxiliary screw being in an auxiliary pocket 19 of casing 4, Fig. 13. In the upper end of screw 18 is seated a Bakelite point 20, which bears against the under face of the angular contact spring. It is to be understood that there are two screws 18, one for each angle contact spring. The fiber base 14 (which can be of any suitable insulated material) is thicker or taller than base 14a, so as to place contact spring 15 in position as shown in Figure 12. On the sliding sleeve 6 are horizontal fingers 21 and 22. Each finger carries near its outer end a silver point 23. The silver point 23 on finger 21 engages the under face of the angular contact spring 15 when the red light is to burn or show, whereas the silver point on finger 22 engages the top of the angular contact spring 15a under normal conditions, that is, when the tire is properly inflated and the green light is burning or showing. Through the medium of the auxiliary screws 18 the contacts can be adjusted to great accuracy, whereby excellent results from an indicating standpoint will be obtained. The fingers 21 and 22 are each screw threaded on their inner ends into the sliding sleeve 5.

Each terminal bolt 13 (Fig. 11) is provided with two washers 24 between which is held a lead 25, and these washers 24 clamp the lead or wire 25 when the nut 26 is screwed tightly on bolt 13. The lead 25 extends to the indicating signal (not shown) of any common type that is located near or upon the instrument board of the motor vehicle. The green light lead 27 is connected to a terminal bolt 13 in the same manner as the red light lead 25 just described; this green light lead 27 extends to the indicating signal, the same as lead 25.

The casing 4 is provided with an annular, horizontal flange 28 (Fig. 13) and on its under face is a circular groove 29. In groove 29 is a circular or annular tooth 30. A rubber cap 31 is placed over the upper part of the device with its end fitting into the groove 29, as clearly shown in Figures 5 and 7; the tooth 30 biting into the cap 31 for holding it in position against accidental displacement. This rubber cap does not permit any chafing of the inner tube 3 by metal surfaces; the cap also excludes moisture and dirt from the device.

A metal shell 32 rests on the flange 28; this shell is a protector for the contact springs 15 and 15a, and their cooperating parts. The shell 32 is provided with a large opening 33 (Fig. 5) to allow free movement of the sleeve 5 and its head 7.

A rubber disc 34 is placed against the bottom of the casing 4 to assist in sealing the casing and its parts against moisture and dirt. This disc 34 is held in place by a cover cap 35 which fits snugly upon the lower end of the housing or casing 4. A cap nut 36 is screwed on the outer end of holding sleeve 5 against the bottom of the cover cap 35, whereby cover cap 35 is held securely on the holding sleeve 5, which sleeve also contains the adjusting, primary screw 10 and coil spring 11.

It is to be understood that when the device is in its normal condition, the circuit will be closed that includes the green light, showing that the tire is properly inflated. As soon as the inner tube 3 is deflated partially, for any reason, the coil spring 11 will push head 7 upwardly, causing the finger 21 and its silver point to contact the angular spring 15, resulting in the red light showing, to be observed by the operator.

When the device is positioned as shown in Figure 1, the cover cap 35 will be pressing against the outer face of rim 1 and the rubber cap 31 will be pressing against the inner face of the rim, whereby the device is not only securely fastened upon the rim, but it is sealed against any moisture or dirt or the like entering the device, as well as entering the rim through the aperture that receives the device.

While I have described the preferred embodiment of my invention and illustrated the same in the accompanying drawings, certain minor changes or alterations may appear to one skilled in the art to which this invention relates during the manufacture of the same, and I, therefore, reserve the right to make such changes or alterations as shall fairly fall within the scope of the appended claims.

What I claim is:

1. In a device of the class described, the combination of a casing, contact springs and means fixedly connecting each spring at its inner end to said casing, said casing provided with means for manually adjusting the outer end of each spring, a movable sleeve provided with contact fingers carried by said casing, and said contact fingers separately engaging said contact springs upon movement of said movable sleeve.

2. In a device of the class described, the combination of a casing, contact springs and means fixedly connecting each spring at its inner end to said casing, manually operated means on said casing for adjusting portions of said springs, terminal bolts on said casing and in contact with said springs, a sliding sleeve provided with contact fingers on said casing, and one of said fingers being adapted to engage the under face of one of said springs and the other finger being adapted to engage the top face of the other spring.

3. In a device of the class described, the combination of a casing provided with contact springs, one spring being higher than the other spring, electrical signalling connecting means connected to said contact springs, a spring-pressed sleeve on said casing, said spring-pressed sleeve provided with two outwardly extending contact fingers one positioned higher than the other, and the highest contact finger being adapted to contact the highest contact spring while the other contact finger is adapted to engage the lower contact spring.

4. In a device of the class described, the combination of a casing provided with a centrally positioned internally and externally threaded primary holding sleeve, a slidable sleeve on the upper end of said primary sleeve, said slidable sleeve provided with a head, said slidable sleeve provided with elongated apertures, screws in said apertures and extending into said primary sleeve, said slidable sleeve provided with an upper and a lower finger, said fingers provided with points, said casing provided with a relatively tall and a relatively low insulating base, an angular spring on each of said bases, the upper finger being adapted to contact the spring on the tall base and the lower finger being adapted to contact the spring on the lower base, said casing provided with auxiliary pockets under said springs, screws in said pockets, each screw being provided with an insulating point engaging the bottom of an angular spring, said casing provided with primary pockets under said angular springs, insulating means in said primary pockets, terminal bolts extending through said insulating means and in contact with said angular springs, said bolts having their lower ends free for electrical connections within the lower ends of said primary pockets, a screw in said primary sleeve, and a coil spring on the inner end of said screw and having its upper end pressing against said head of the slidable sleeve.

5. In a device of the class described, the combination of a casing provided with contact springs, a centrally located sleeve in said casing, a slidable sleeve provided with a head and contact fingers on said first mentioned sleeve, a spring in said first mentioned sleeve and bearing against said head, said first mentioned sleeve provided with manually operated means for controlling or adjusting the tension of said spring, and said contact fingers being adapted to engage said contact springs.

6. In a device of the class described, the combination of a casing, said casing provided with a pair of primary pockets and a pair of auxiliary pockets, contact springs over said pockets, manually operated means in said auxiliary pockets for adjusting said contact springs, and tire operated means for closing a circuit through either of said contact springs.

7. In a device of the class described, the combination of a casing provided with a pair of primary pockets and a pair of auxiliary pockets, flat springy contact springs over said pockets, said springs provided with means securing one end of said springs to said casing, terminal bolts provided with insulating means in said primary pockets and in contact with said springs, manually operated screws in said auxiliary pockets and provided with means contacting said springs, and tire operated means for closing a circuit through either of said contact springs.

8. In a device of the class described, the combination of a casing provided with a central sleeve and a sliding sleeve having a head mounted on said central sleeve, said sliding sleeve and casing provided with a pair of circuit closing devices, and a flexible cap on said casing and closing the same from entrance of moisture, dirt, and the like.

9. In a device of the class described, the combination of a casing provided with a central sleeve projecting above and below said casing, said casing and sleeve provided with two circuit closing devices at the top of said casing, and said sleeve provided with means below said casing closing and sealing the bottom of said casing as well as the bottom of said central sleeve.

EDWARD C. JONES.

REFERENCES CITED

The following references are of record in the file of this patent:

UNITED STATES PATENTS

| Number | Name | Date |
| --- | --- | --- |
| 1,773,215 | Bond | Aug. 19, 1930 |
| 2,343,060 | Horning | Feb. 29, 1944 |
| 1,316,372 | Liebreich | Sept. 16, 1919 |